UNITED STATES PATENT OFFICE.

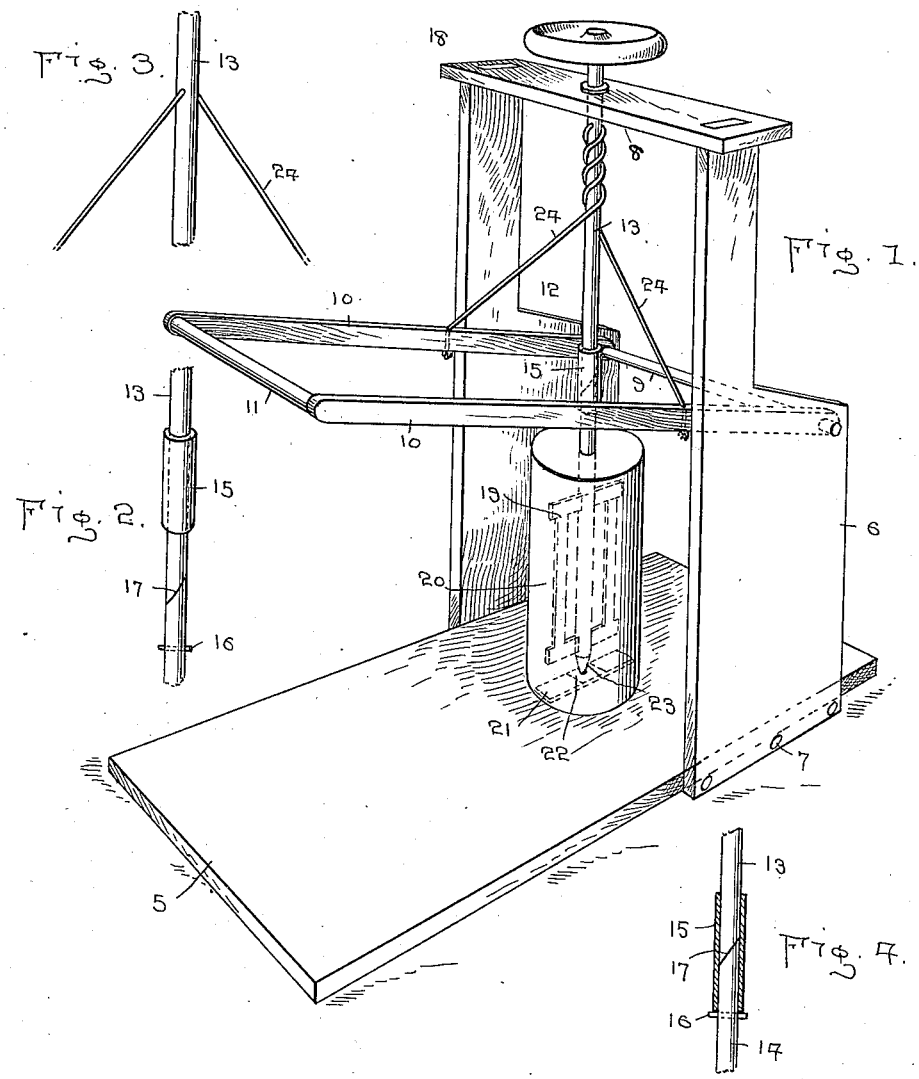

JOHN J. CRUME, OF AMARILLO, TEXAS.

CHURNING-MACHINE.

1,092,694.  Specification of Letters Patent.  Patented Apr. 7, 1914.

Application filed June 18, 1913. Serial No. 774,416.

*To all whom it may concern:*

Be it known that I, JOHN J. CRUME, a citizen of the United States, residing at Amarillo, in the county of Potter and State of Texas, have invented certain new and useful Improvements in Churning-Machines; and I do hereby declare the following to be a full, clear, and exact description of the invention, such as will enable others skilled in the art to which it appertains to make and use the same.

This invention relates to churns, and one of the principal objects thereof is to provide a churning machine which may be used in connection with containers of different sizes.

Another object is to provide means for easily and quickly removing a container from the machine.

A further object is to provide a churning machine which will be easy in operation and comparatively free from friction.

A still further object is to provide a churning machine which will be simple, durable, efficient in operation, and inexpensive to manufacture.

These and other objects may be attained by means of the construction, combination and arrangement of parts, hereinafter more fully described and claimed, and illustrated in the accompanying drawings, in which like characters of reference indicate like parts throughout the several views, in which, Figure 1, is a perspective view of my machine, showing the same in operative position. Fig. 2, is a perspective view of a portion of the dasher stem, showing the collar in raised position. Fig. 3, is an elevational view of a portion of the dasher stem, showing the means of attaching the cable thereto. Fig. 4, is an elevational view of the portion of the stem shown in Fig. 2, the collar being shown in section and in a lowered position.

Referring more particularly to the drawing, the frame of the machine provides a rectangular base 5, uprights 6, secured at their lower ends to the base member by means of nails or screws 7, and a cross bar 8, mortised or otherwise secured on the upper reduced ends of the uprights 6. A horizontal pivot bar 9, is fastened to the uprights 6, at the rear thereof and near the upper ends of the enlarged portions thereof, and pivotally supports the rear ends of lever arms 10, the front ends of which are connected by means of a handle 11.

Journaled in a vertical position centrally of the cross bar 8, is a dasher stem 12, comprising an upper portion 13, and a lower portion 14, adapted to be detachably secured in operative position by means of a collar 15, slidable on the rod and adapted, when in its lowered position, to rest against a removable stop pin 16, thereby embracing the oppositely beveled ends 17, of the rod, whereby as is obvious, a turn of the upper portion 13 of the rod will impart rotary motion to the lower portion 14 thereof. A fly wheel 18, is keyed or otherwise secured to the upper end of the dasher stem. The lower portion 14, of the stem has secured crosswise thereto and in spaced relation, a pair of horizontal dasher members 19, which are connected at their ends by vertical pieces 20. As seen in Fig. 1, the dasher is adapted to be positioned within a container, and there is provided a strip of wood or other material 21 adapted to removably rest against the bottom of the container and has seated therein a metal plate 22, provided with a socket in which is adapted to rest the pointed pin 23, which is secured to the lower end of the section 14. The upper end of the section 14, is adapted to extend through the cover of a container, and to connect with the upper portion 13, above said cover. A cable or rope 24, passes laterally through the upper portion of the section 13, under the cross bar 8, and has its ends pass through openings in the opposite lever bars 10, and knotted to secure the rope therein.

The operation of my device may be briefly described as follows: Assuming the device to be assembled and the dasher to be positioned within a container, the fly wheel 18, is first rotated in either direction, thereby winding the cable upon the dasher rod and thus raising the forward end of the hand lever. The fly wheel is then released and the lever forced downwardly, thereby rotating the dasher rod and dasher, and as the lever reaches the lower end of the stroke, the pressure upon it is relieved, whereby the momentum of the fly wheel will rewind the cable upon the dasher stem in an opposite direction, the lever at the same time being raised by hand to lessen the resistance. When the cable is rewound as far as possible, the lever is again forced downwardly, the operation proceeding as before. When it is desired to remove the container, the collar 15 is raised and the container removed. The stop pin 16, may then be removed and the top of the container slipped off of the collar section 14 of the stem, whereupon the latter may be removed bodily from the container. After the container is emptied of its contents, the strip 21, may be lifted out.

It is obvious that the strip 21, is made of a length corresponding to the inside diameter of the container and the ends of said strip rounded to conform to the curvature of said container. By simply placing the strip 21, on the bottom of the container, the dasher stem is centered therein and thus no special means is needed for holding the container on the base 5.

Although I have described the preferred embodiment of my invention, I reserve and may exercise the right to make such changes in the construction, combination and arrangement of parts, as do not depart from the spirit of the invention and the scope of the appended claims.

Having thus fully described my invention, what I claim as new and desire to secure by Letters-Patent, is,

1. A churning machine comprising a container, a base supporting the container, uprights secured to the base, a dasher stem consisting of an upper and a lower section, said upper section being supported by said uprights, the adjacent ends of said sections being oppositely beveled, a stop pin removably secured in said lower section near the beveled end thereof, a collar slidable upon the upper section and adapted to normally rest against said stop pin and embrace the adjoining ends of the sections, said lower section adapted to enter and be supported within the container, and means for rotating the dasher stem.

2. A churning machine comprising a container, a flat base member adapted to support the container, uprights secured to the opposite sides of the base member adjacent its rear end, a cross bar secured to the upper end of said uprights, a vertical, sectional dasher stem having its upper section journaled in said cross bar, a fly wheel keyed upon the upper end of said upper section, a dasher on the lower portion of said lower section of the stem adapted to be seated in the container, arms projecting from the rear of said uprights, and at an intermediate portion thereof, a lever pivoted at one end to the outer extremity of said arms and directed toward the front end of said base, a horizontal handle connecting the opposite ends of the levers, the upper section of said dasher stem being formed with a transverse aperture therein adjacent the upper end thereof, and a cable extending through said apertures and having its opposite ends secured to an intermediate portion of opposite levers whereby the dasher may be rotated.

3. A churning machine comprising a base member, uprights projecting from the sides of said base member, a container supported upon said base member, a cross bar connecting said uprights, a vertical, sectional dasher stem having the upper section journaled in said cross bar, a dasher on the lower section of the stem, a strip adapted to be seated in the bottom of said container and having a central portion thereof formed with a recess, a lower extremity of said lower section being tapered and adapted to be received in said recess and to support the dasher within the container, means for removably securing the adjacent ends of the stem, and means for rotating the stem.

In testimony whereof I have signed my name to this specification in the presence of two subscribing witnesses.

JOHN J. CRUME.

Witnesses:
J. L. SUMMERS,
R. S. KILLOUGH.